United States Patent
Tsukui et al.

(10) Patent No.: US 10,326,172 B2
(45) Date of Patent: Jun. 18, 2019

(54) METHOD FOR PRODUCING SECONDARY BATTERY AND SECONDARY BATTERY

(71) Applicant: TOYOTA JIDOSHA KABUSHIKI KAISHA, Toyota-shi, Aichi (JP)

(72) Inventors: Akira Tsukui, Nagoya (JP); Hiroyasu Kado, Seto (JP); Shinobu Okayama, Miyoshi (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 215 days.

(21) Appl. No.: 15/124,802

(22) PCT Filed: Mar. 11, 2015

(86) PCT No.: PCT/JP2015/001354
§ 371 (c)(1),
(2) Date: Sep. 9, 2016

(87) PCT Pub. No.: WO2015/136937
PCT Pub. Date: Sep. 17, 2015

(65) Prior Publication Data
US 2017/0025714 A1    Jan. 26, 2017

(30) Foreign Application Priority Data
Mar. 14, 2014    (JP) .................................. 2014-052739

(51) Int. Cl.
*H01M 2/36* (2006.01)
*H01M 10/0567* (2010.01)
(Continued)

(52) U.S. Cl.
CPC ......... *H01M 10/4235* (2013.01); *H01M 2/36* (2013.01); *H01M 2/365* (2013.01);
(Continued)

(58) Field of Classification Search
CPC ......... H01M 10/4235; H01M 10/0431; H01M 10/0567; H01M 10/0587; H01M 10/446; H01M 2/36; H01M 2/365
See application file for complete search history.

(56) References Cited

U.S. PATENT DOCUMENTS

2004/0072072 A1    4/2004   Suzuki et al.
2010/0313410 A1   12/2010   Min et al.
(Continued)

FOREIGN PATENT DOCUMENTS

| CN | 1263184 C | 7/2006 |
| CN | 102549831 A | 7/2012 |

(Continued)

OTHER PUBLICATIONS

International Search Report of PCT/JP2015/001354, dated Jul. 3, 2015. [PCT/ISA/210].
Written Opinion of PCT/JP2015/001354, dated Jul. 3, 2015. [PCT/ISA/237].

*Primary Examiner* — Jonathan G Jelsma
(74) *Attorney, Agent, or Firm* — Sughrue Mion, PLLC

(57) ABSTRACT

The present invention provides a method for producing a secondary battery, capable of forming a uniform membrane on a wound body. Provided is a method including a step for reducing an internal pressure of an exterior, a step for pouring an electrolyte solution (E) into the exterior, a step for sealing the exterior, a step for impregnating the electrolyte solution (E) into the wound body from both axial end portions thereof, a step for performing initial charging of a battery, and a step for performing high-temperature aging of the battery. The additive LPFO is added into the electrolyte solution (E) in an amount such that the internal pressure of the exterior in the step for performing the high-temperature
(Continued)

aging becomes equal to or higher than a saturation vapor pressure of the electrolyte solution (E) in the high-temperature aging.

5 Claims, 12 Drawing Sheets

(51) Int. Cl.
    *H01M 10/0587*   (2010.01)
    *H01M 10/44*   (2006.01)
    *H01M 10/42*   (2006.01)
    *H01M 10/04*   (2006.01)
    *H01M 10/0525*   (2010.01)
    *H01M 10/052*   (2010.01)

(52) U.S. Cl.
    CPC ... *H01M 10/0431* (2013.01); *H01M 10/0525* (2013.01); *H01M 10/0567* (2013.01); *H01M 10/0587* (2013.01); *H01M 10/446* (2013.01); *H01M 10/052* (2013.01); *H01M 2300/0025* (2013.01)

(56) References Cited

U.S. PATENT DOCUMENTS

| | | | | |
|---|---|---|---|---|
| 2012/0141869 A1* | 6/2012 | Takahata | ............ | H01M 10/052 |
| | | | | 429/188 |
| 2013/0247364 A1* | 9/2013 | Fukatsu | ............ | H01M 10/0404 |
| | | | | 29/623.2 |
| 2015/0140368 A1* | 5/2015 | Hirakawa | ............ | H01M 2/365 |
| | | | | 429/53 |
| 2015/0229002 A1* | 8/2015 | Kawasoe | ............ | H01M 10/052 |
| | | | | 429/188 |
| 2015/0244032 A1* | 8/2015 | Yamamoto | ......... | H01M 10/446 |
| | | | | 29/623.1 |
| 2016/0268626 A1* | 9/2016 | Ishida | ............ | H01M 2/36 |

FOREIGN PATENT DOCUMENTS

| | | |
|---|---|---|
| JP | 9-102443 A | 4/1997 |
| JP | 2010-528404 A | 8/2010 |
| JP | 2013-20735 A | 1/2013 |
| JP | 2015-79578 A | 4/2015 |
| JP | 2015-97139 A | 5/2015 |
| WO | 2013/132824 A1 | 9/2013 |
| WO | 2014/038174 A1 | 3/2014 |
| WO | WO-2014038174 A1 * | 3/2014 ......... H01M 10/052 |

* cited by examiner

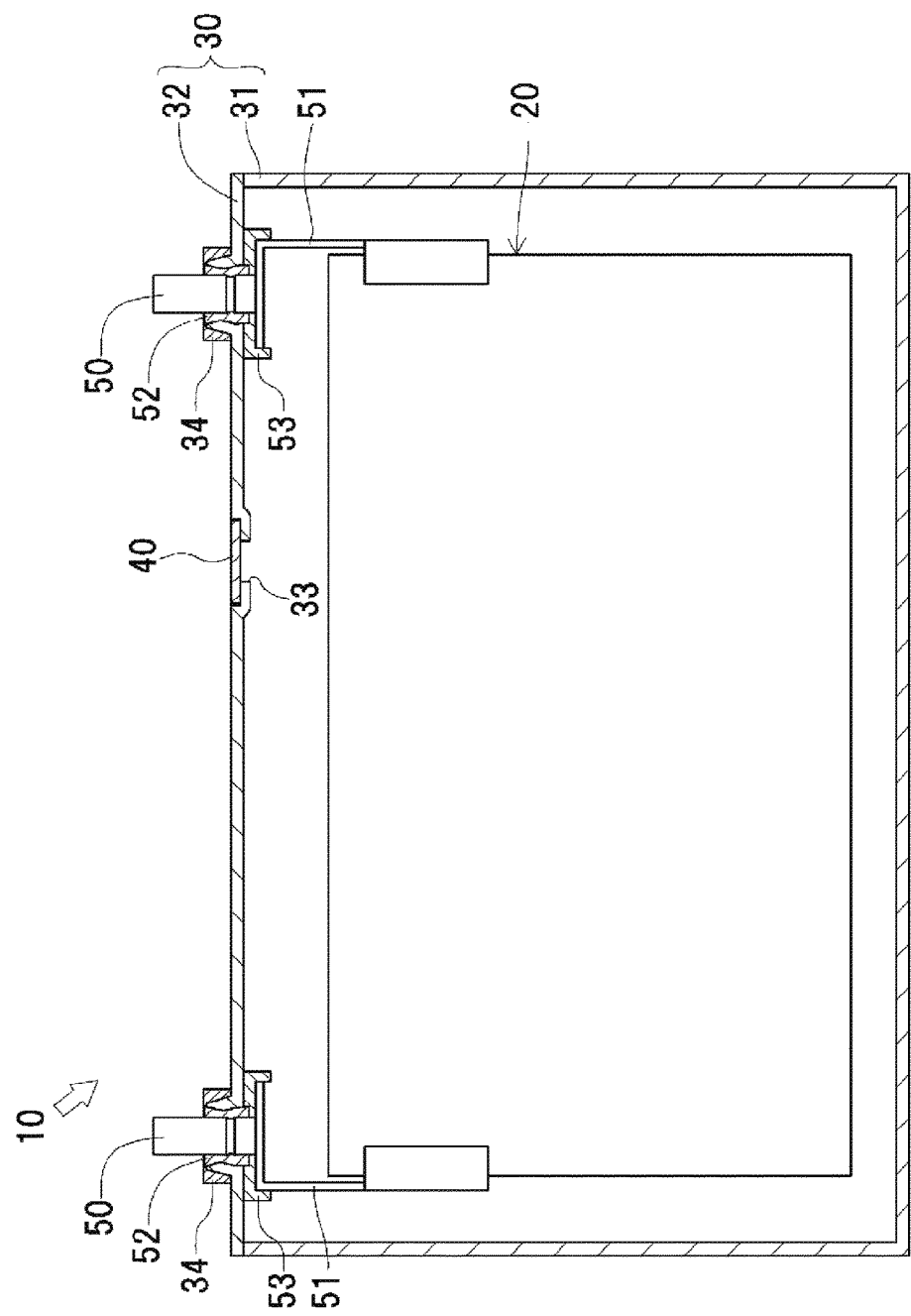
[Fig. 1]

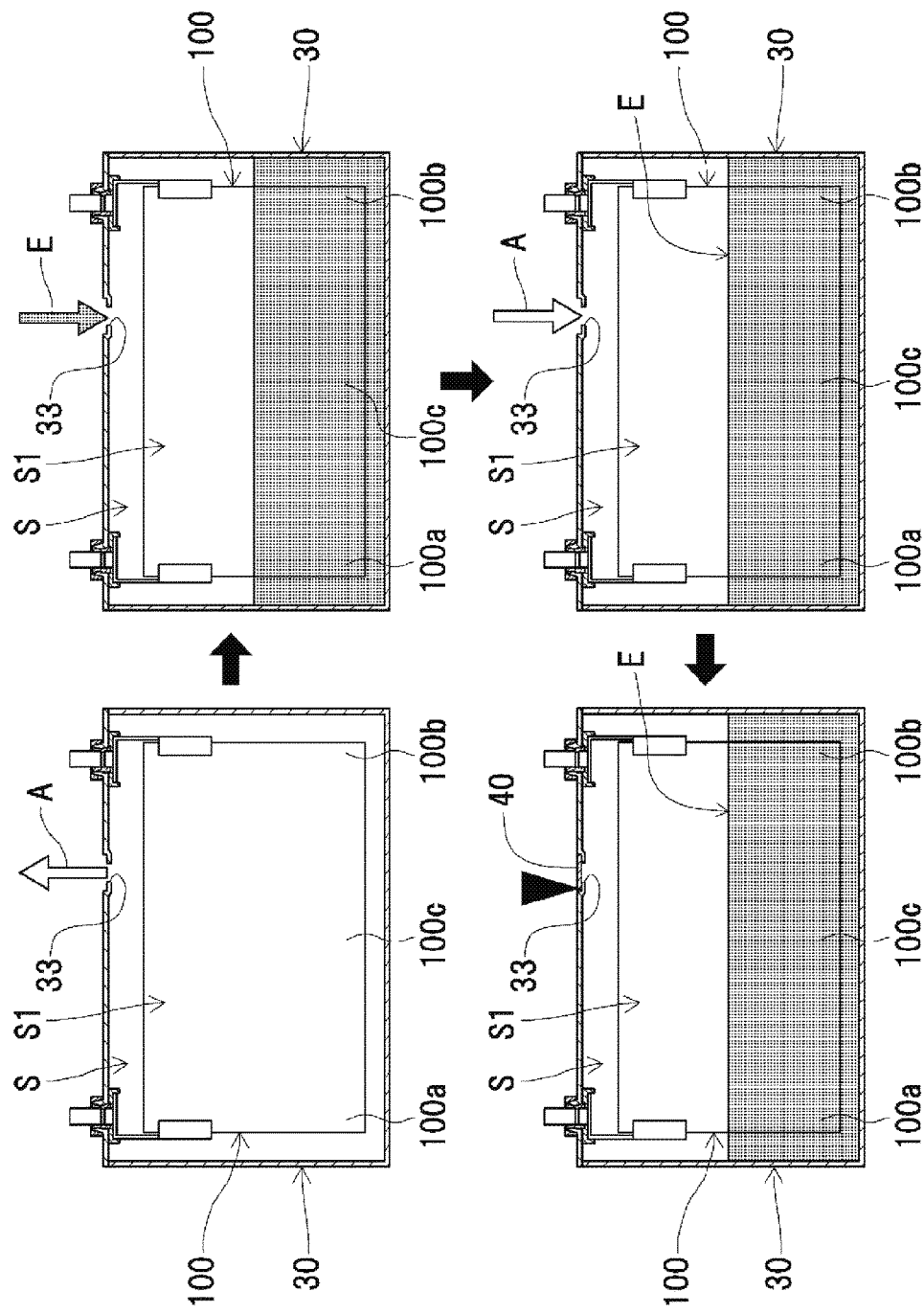
[Fig. 3]

[Fig. 4]
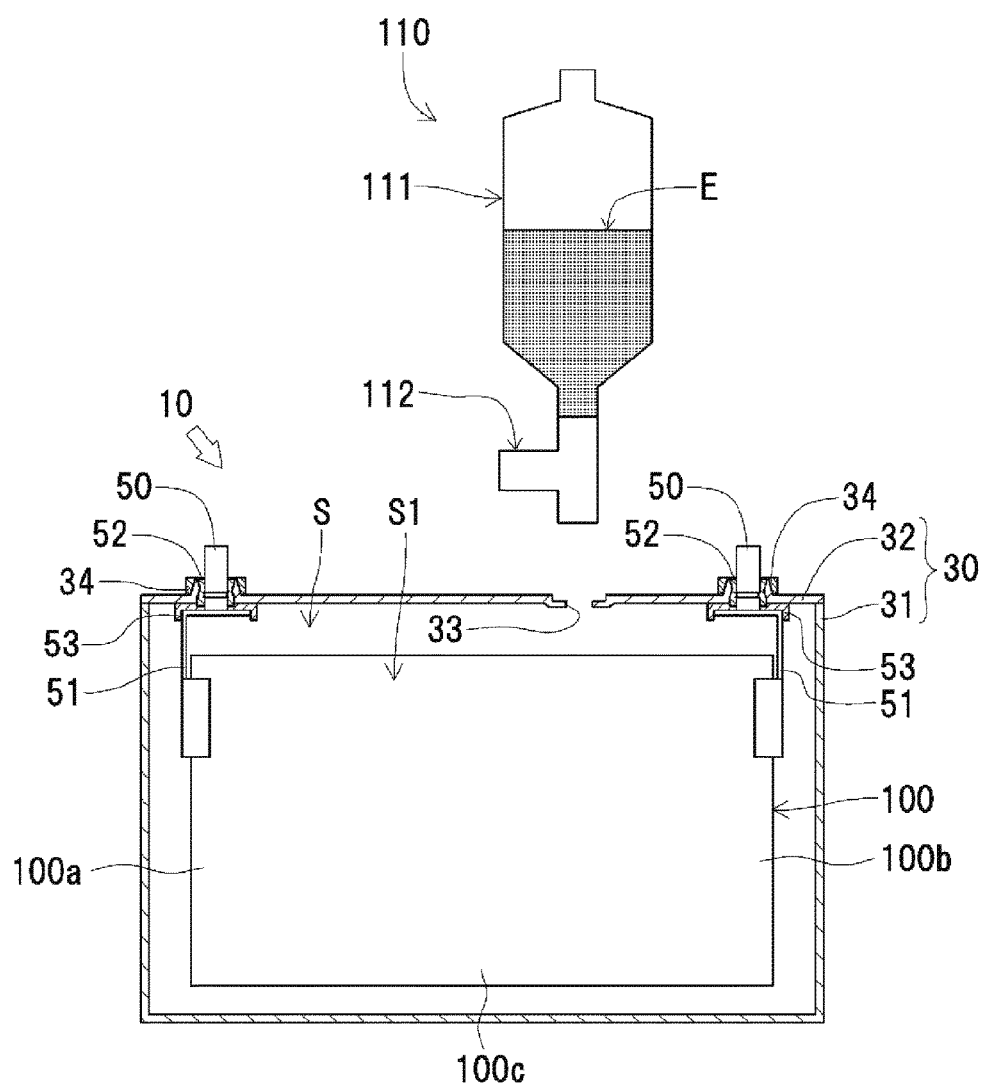

(a)
Fig. 5A
(b)
Fig. 5B
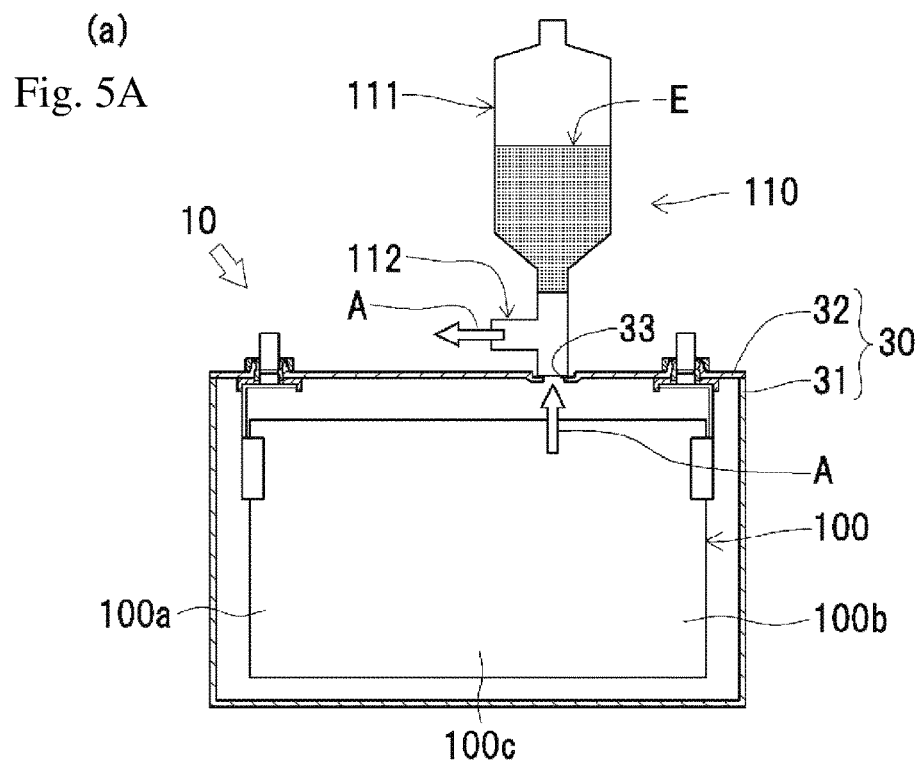
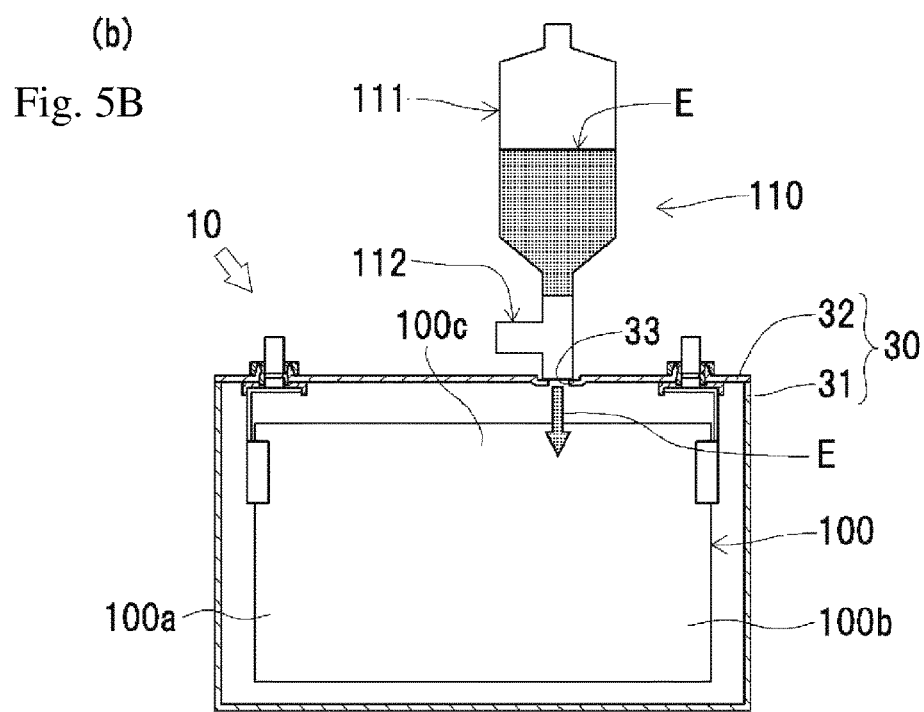

(a) Fig. 6A
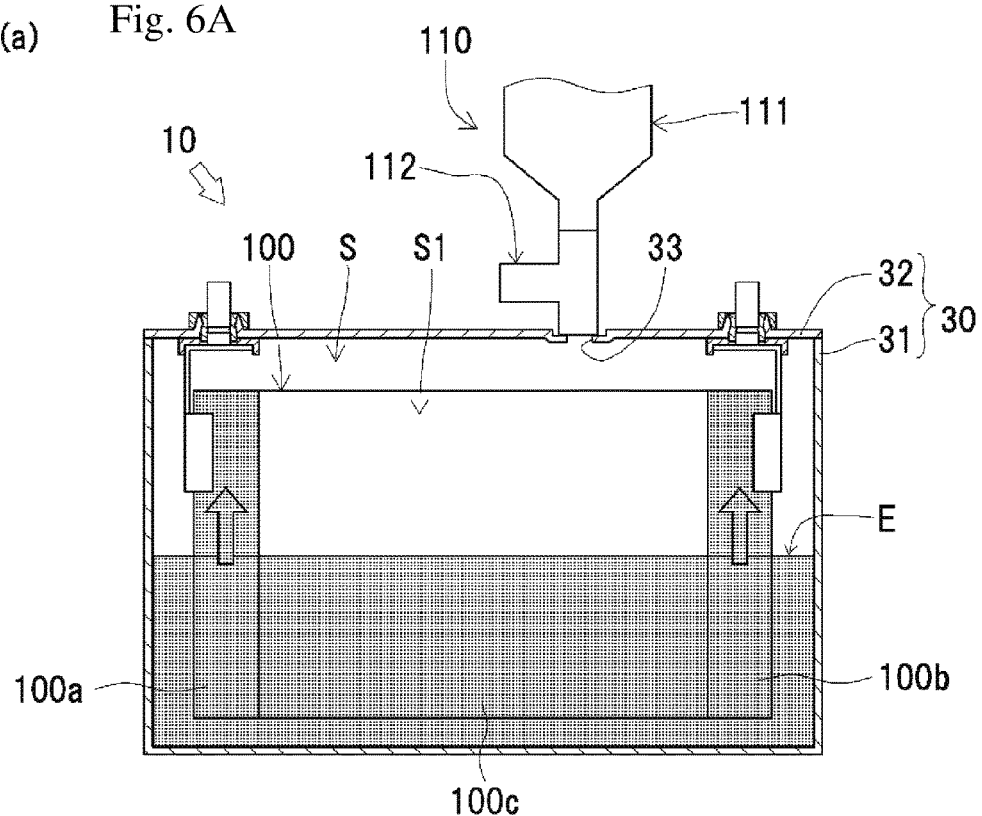
Fig. 6B (b)
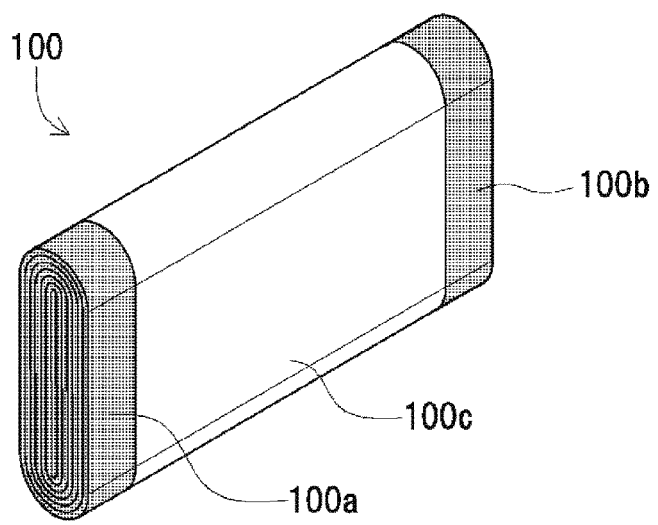

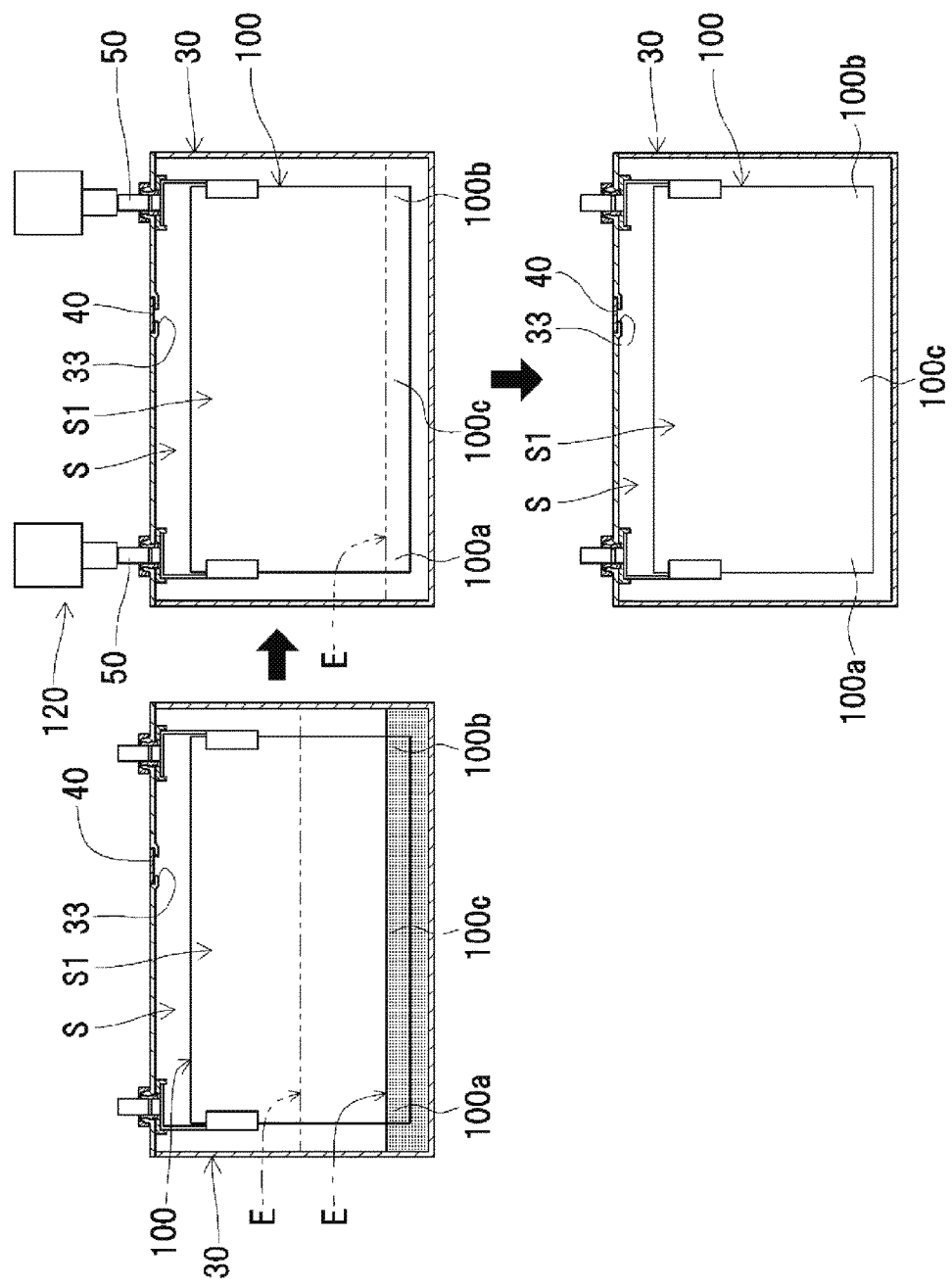
[Fig. 7]

(a)

(b)

(a)

(a)

[Fig. 11]
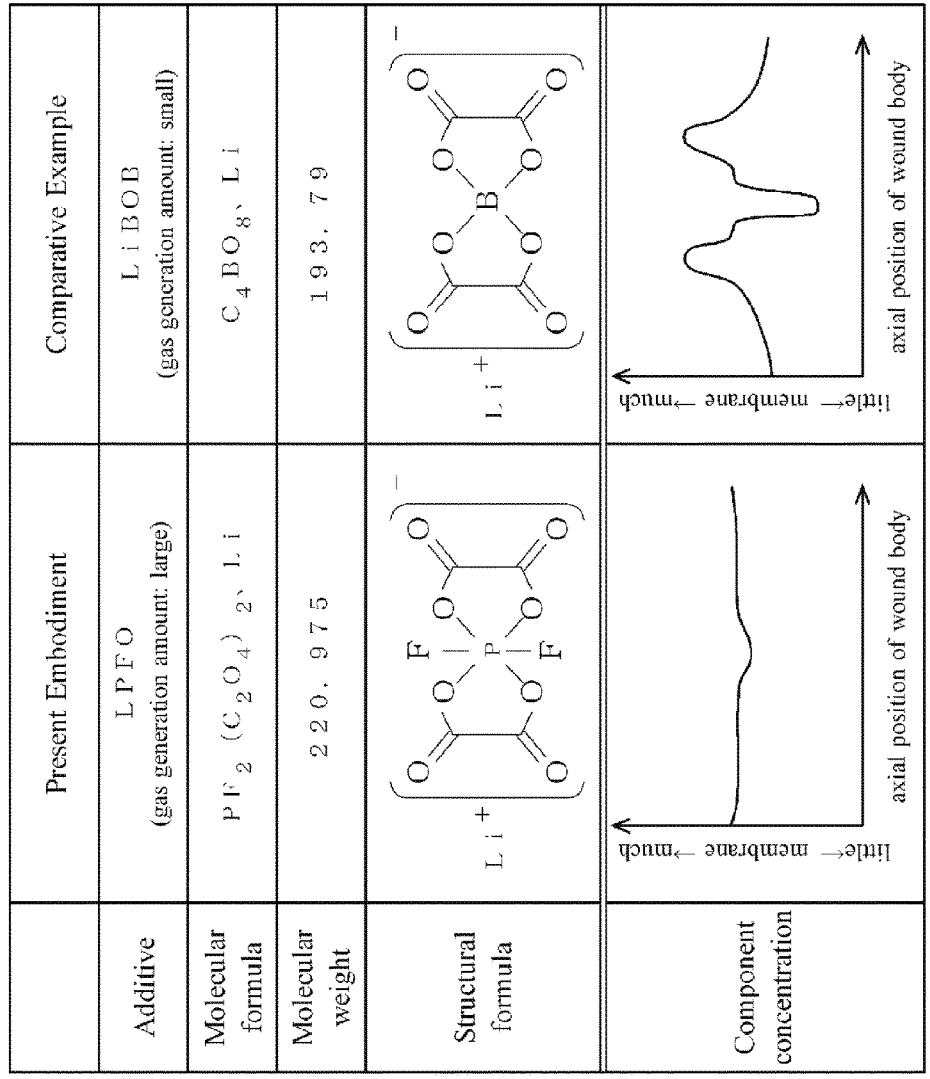

[Fig. 12]
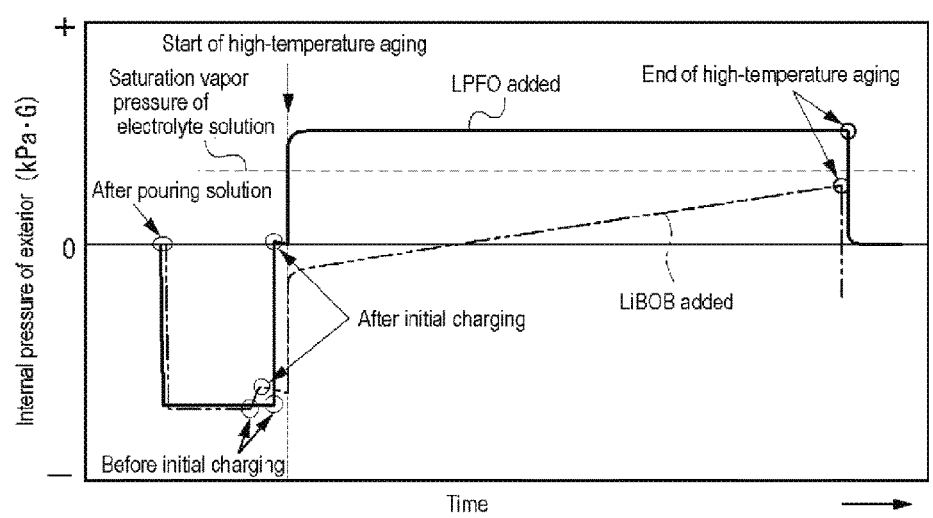

METHOD FOR PRODUCING SECONDARY BATTERY AND SECONDARY BATTERY

CROSS REFERENCE TO RELATED APPLICATIONS

This application is a National Stage of International Application No. PCT/JP2015/001354 filed Mar. 11, 2015, claiming priority based on Japanese Patent Application No. 2014-052739, filed Mar. 14, 2014, the contents of all of which are incorporated herein by reference in their entirety.

TECHNICAL FIELD

The present invention relates to a method for producing a secondary battery, including a step for pouring an electrolyte solution into a battery case whose internal pressure is reduced, and to a secondary battery.

BACKGROUND ART

Conventionally, in the step for producing a secondary battery such as a lithium ion secondary battery, a wound body made by winding a positive electrode, a negative electrode and a separator is laterally housed in a battery case. In the step for producing the secondary battery, the battery case is sealed after pouring the electrolyte solution into the battery case, and the wound body is impregnated with the electrolyte solution. Further, in the step for producing the secondary battery, initial charging of the secondary battery is carried out. At this time, a membrane is formed on the wound body by decomposition reaction of the electrolyte solution.

In a technique disclosed in Patent Literature 1, an opening of a case (battery case) is closed to reduce the internal pressure of the case, and then an electrolyte solution is poured into the case whose internal pressure is reduced.

In the technique disclosed in Patent Literature 1, the internal pressure of the case is increased to a pressure higher than an atmospheric pressure while pouring the electrolyte solution (or simultaneously with the pour of the electrolyte solution), and thereby the electrolyte solution is impregnated into the wound body.

Immediately after pouring the electrolyte solution, the electrolyte solution permeates into both axial end portions of the wound body by a capillary phenomenon. Thereby, a sealed space is formed inside the wound body.

In the case where the internal pressure of the case is increased while pouring the electrolyte solution as in the technique disclosed in Patent Literature 1, the pressurized air inside the case may push the electrolyte solution that has permeated into both the axial end portions of the wound body away, thereby raising a possibility that the air may penetrate into the wound body.

In other words, in this case, there is a possibility that the electrolyte solution cannot be impregnated into the path of air penetration and the axial middle portion of the wound body.

For this reason, by the technique disclosed in Patent Literature 1, a uniform membrane may not be formed on the wound body.

CITATION LIST

Patent Literature

PTL1: JP 09-102443 A

SUMMARY OF INVENTION

Technical Problem

The present invention has been accomplished in view of the circumstances as mentioned above. The object of the present invention is to provide a method for producing a secondary battery, capable of forming a uniform membrane on a wound body, as well as a secondary battery.

Solution to Problem

A first aspect of the invention is a method for producing a secondary battery, including a step for reducing an internal pressure of a battery case, a step for pouring an electrolyte solution, into which an additive is added, into the battery case whose internal pressure is reduced, a step for sealing the battery case into which the electrolyte solution is poured, a step for waiting to reduce a difference between a pressure of an external space of a wound body, which is a space between the sealed battery case and the wound body, and a pressure of an internal space of the wound body, and for impregnating the electrolyte solution into the wound body from both axial end portions of the wound body to reduce a volume of the internal space of the wound body, a step for performing initial charging of the secondary battery in which the wound body is impregnated with the electrolyte solution, and a step for performing high-temperature aging of the initially charged secondary battery while maintaining the seal of the battery case. The additive is added into the electrolyte solution in an amount such that, by a gas produced through decomposition reaction of the additive, the internal pressure of the battery case in the step for performing the high-temperature aging becomes equal to or higher than a saturation vapor pressure of the electrolyte solution in the high-temperature aging.

Preferably, the additive is added into the electrolyte solution in an amount adjusted so that, by generation of the gas, the internal pressure of the battery case in the step for performing the high-temperature aging becomes equal to or higher than the saturation vapor pressure of the electrolyte solution in the high-temperature aging, and such that, in the step for performing the initial charging, the internal pressure of the battery case becomes lower than the saturation vapor pressure of the electrolyte solution in the high-temperature aging.

Preferably, the additive is added into the electrolyte solution in an amount such that, by generation of the gas, the internal pressure of the battery case immediately after the initial charging becomes equal to an atmospheric pressure.

Preferably, in the step for performing the initial charging, the secondary battery is charged at a lower rate in an electric potential region where the gas is generated than rate in other electric potential regions.

A second aspect of the invention is a secondary battery including a battery case, an electrolyte solution into which an additive is added and which is poured into the battery case whose internal pressure is reduced, and a wound body which is housed in the battery case and in which a volume of an internal space of the wound body is reduced by permeation of the electrolyte solution from both axial end portions of the wound body by leaving the battery case which is sealed after pouring the electrolyte solution into the battery case to stand. High-temperature aging is performed while maintaining the seal of the battery case after initial charging. The additive is added into the electrolyte solution in an amount such that, by a gas produced through decomposition reaction of the additive, the internal pressure of the battery case in the high-temperature aging becomes equal to or higher than a saturation vapor pressure of the electrolyte solution in the high-temperature aging.

Advantageous Effects of Invention

The present invention produces an effect such that a uniform membrane can be formed on a wound body.

BRIEF DESCRIPTION OF DRAWINGS

FIG. 1 shows an overall construction of a battery.

FIG. 2A shows how to wind a positive electrode, a negative electrode and a separator. FIG. 2B shows how to press the wound body.

FIG. 3 shows a decompressing step to a sealing step in the present embodiment.

FIG. 4 shows a pouring unit.

FIGS. 5A and 5B shows how to operate the pouring unit. FIG. 5A shows the decompressing step. FIG. 5B shows the pouring step.

FIGS. 6A and 6B shows a degree of permeation of an electrolyte solution in the pouring step. FIG. 6A is a sectional view. FIG. 6B is a perspective view of the wound body.

FIG. 7 shows an impregnating step to a high-temperature aging step in the present embodiment.

FIG. 8A is a sectional view. FIG. 8B is a perspective view of the wound body.

FIG. 9A is a sectional view. Fig. 9B is a perspective view of the wound body.

FIG. 10A is a sectional view. FIG. 10B is a perspective view of the wound body.

Fig. 11 shows a result of evaluation of the membrane by changing additives.

Fig. 12 shows change of the internal pressure of the exterior with lapse of time after pouring the electrolyte solution into an exterior until the end of the high-temperature aging with respect to a battery in which LPFO is used as an additive to the electrolyte solution and a battery in which LiBOB is used as an additive to the electrolyte solution.

DESCRIPTION OF EMBODIMENTS

Figure 2A:
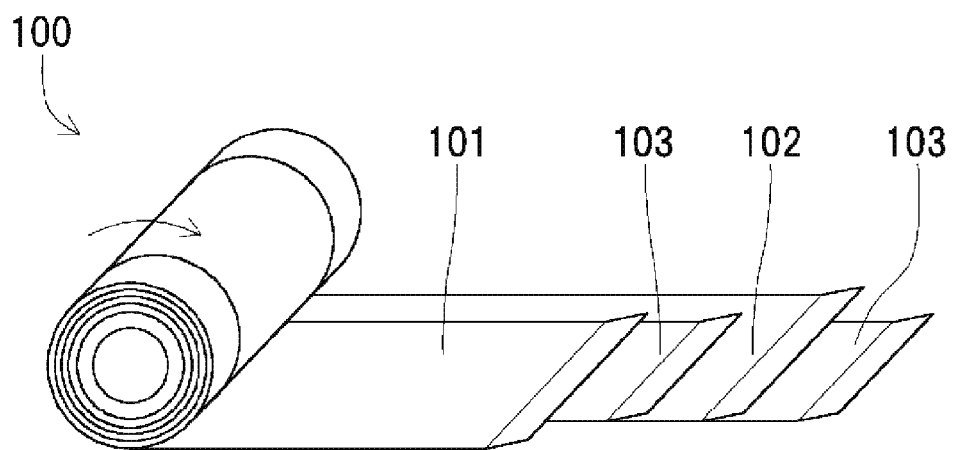
FIGS. 2A and 2B shows how to produce a wound body.

Described below is a method for producing a sealed battery of the present embodiment (hereinafter simply referred to as "producing method").

First, a schematic construction of the battery as an embodiment of the secondary battery according to the present invention is described.

The battery 10 of the present embodiment is a sealed-type lithium ion secondary battery. An object to which the present invention is applied is not limited to the lithium ion secondary battery, and the present invention may be applied also to other secondary batteries such as a nickel hydrogen secondary battery.

As shown in FIG. 1, the battery 10 includes a power-generating element 20, an exterior 30, a cap 40, and external terminals 50.

Figure 2B:
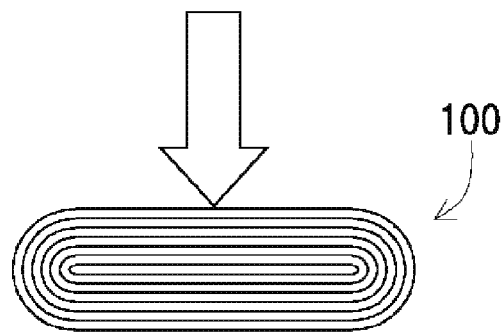

The power-generating element 20 is made by impregnating an electrolyte solution F into a wound body 100 formed by winding a positive electrode 101, a negative electrode 102 and a separator 103 (See FIGS. 2A, 2B and 3). At the time of discharging and charging of the battery 10, a chemical reaction occurs inside the power-generating element 20 (strictly, movement of ions via the electrolyte solution F occurs between the positive electrode 101 and the negative electrode 102), and thereby an electric current is generated.

The exterior 30 serving as a battery case is a prismatic can formed to have a generally rectangular shape as viewed in a plan view with the right-and-left direction being the longitudinal direction in FIG. 1. The exterior 30 has a housing 31 and a lid 32.

The housing 31 is a prismatic member having a bottom with a closed lower surface, closed side surfaces, and an opened upper surface, and houses the power-generating element 20 in the inside thereof.

The lid 32 is a flat-plate-shaped member having a shape that accords to the opening surface of the housing 31 and is bonded to the housing 31 in a state in which the opening surface of the housing 31 is closed. In the lid 32, a pouring hole 33 through which the electrolyte solution E is poured is formed between the sites where the external terminals 50 are inserted as mentioned later.

The pouring hole 33 is a hole that penetrates through the plate surface of the lid 32, namely, a hole formed in the upper surface of the exterior 30. The pouring hole 33 is a hole having a generally circular shape as viewed in a plan view in which the inner diameter dimension differs between the upper side (outer side) and the lower side (inner side) of the lid 32. In the pouring hole 33, the inner diameter on the upper side is formed to be larger than the inner diameter on the lower side, and a step portion is formed in the middle between the upper side and the lower side.

The cap 40 is a lid body that seals the pouring hole 33. The outer diameter of the cap 40 has approximately the same dimension as the inner diameter on the upper side of the pouring hole 33.

The cap 40 is mounted on the aforesaid step portion of the pouring hole 33 and is bonded to the lid 32 by laser welding of outer peripheries.

The external terminals 50 are disposed in a state in which a part thereof protrudes above (to the outside of) the battery 10 from the outer side surface of the lid 32. The external terminals 50 are electrically connected respectively to the positive electrode 101 or the negative electrode 102 of the power-generating element 20 via collecting terminals 51. By fitting of a fixation member 34 to an outer circumferential surface of the external terminals 50, the external terminals 50 are fixed in a state of being insulated from the lid 32 with insulating members 52 and 53 interposed therebetween. The external terminals 50 and the collecting terminals 51 function as energization paths through which the electric power stored in the power-generating element 20 is taken out to the outside or the electric power from the outside is taken in into the power-generating element 20.

The collecting terminals 51 are connected to a positive electrode plate and a negative electrode plate of the power-generating element 20. As materials of the collecting terminals 51, aluminum can be adopted on the positive electrode side, and copper can be adopted on the negative electrode side, for example.

Thread-processing is carried out on the site of the external terminals 50 that protrudes toward the outside of the battery 10 by thread rolling, thereby to form a bolt portion. When the battery 10 is actually used, bus bars, connection terminals of an external device, or the like are fastened and fixed to the external terminals 50 by using this bolt portion.

At the time of fastening and fixing, a fastening torque is applied to the external terminals 50, and an external force is applied in the axial direction by thread fastening. For this reason, a high-strength material such as iron is preferably adopted as a material of the external terminals 50.

Next, a producing method of the present embodiment is described.

First, in the producing method, after a mixture (positive electrode mixture and negative electrode mixture) is applied onto a surface of a collector (positive electrode collector and negative electrode collector) using an applicator such as a die-coater, the mixture is dried.

Next, in the producing method, a pressing treatment is carried out on the mixture lying on the surface of the collector, so as to form a mixture layer (positive electrode mixture layer and negative electrode mixture layer) on the surface of the collector, thereby to generate a positive electrode 101 and a negative electrode 102.

As shown in FIGS. 2A and 2B, in the producing method, the positive electrode 101 and the negative electrode 102 are laminated with a separator 103 interposed therebetween. In the producing method, the positive electrode 101 and the negative electrode 102 are wound with the separator 103 interposed therebetween with the axial direction of the positive electrode 101 serving as a winding axis direction, and a pressing treatment is carried out on an outer circumferential surface of the aforesaid wound article, thereby to generate a wound body 100 (See the arrow shown in FIGS. 2A and 2B.)

Further, in the producing method, external terminals 50, collecting terminals 51, and others integrated with a lid 32 of an exterior 30 are connected to the wound body 100, and the wound body 100 is housed into a housing 31 of the exterior 30. After that, in the producing method, the housing 31 of the exterior 30 and the lid 32 are connected by welding, so as to seal as a can.

At this time, as shown in FIGS. 2A, 2B and 3, in the producing method, the wound body 100 is housed into the exterior 30 so that the wound body 100 may lie in a laterally directed posture, namely, so that the axial direction of the wound body 100 (the aforesaid winding axis direction) may be parallel to the longitudinal direction of the exterior 30.

In other words, in FIG. 3, the axial direction of the wound body 100 is the right-and-left direction.

Hereinafter, the internal space of the wound body 100, namely, the space formed between laminated surfaces of the positive electrode 101, the negative electrode 102 and the separator 103, is referred to as "internal space S1".

The space between the exterior 30 and the wound body 100, namely, the space obtained by excluding the internal space S1 from the internal space of the exterior 30 is referred to as "external space S".

As shown in FIG. 3, in the producing method, after the exterior 30 is sealed as a can, the air in the exterior 30 placed in an ambient air atmosphere of 1 atm is discharged through the pouring hole 33, so as to perform a decompressing step for reducing the internal pressure of the exterior 30 (See the arrow A in the upward direction shown in FIG. 3).

At this time, in the producing method, the internal pressure of the exterior 30 is reduced until a high vacuum degree is attained. The air in the internal space S1 passes through both the axial end portions 100a and 100b of the wound body 100 to enter the external space S and then is discharged to the outside.

In the producing method, after the internal pressure of the exterior 30 is reduced, a pouring step for pouring an electrolyte solution E through the pouring hole 33 into the exterior 30 having a reduced pressure is carried out (See the arrow E shown in FIG. 3).

The decompressing step and the pouring step such as mentioned above are carried out, for example, by using a pouring unit 110 such as shown in FIG. 4.

As shown in FIG. 4, regarding the pouring unit 110, a pouring pod 111 in which the electrolyte solution E is stored in the inside thereof is connected to a port on the upper side of a three-way valve 112, and a vacuum pump is connected to a port on the left side of the three-way valve 112.

The pouring unit 110 is placed above the exterior 30 and is constructed to be movable in the up-and-down direction, namely, to be elevatable upwards and downwards. In FIG. 4, a state is shown in which other members are not connected to a port on the lower side of the three-way valve 112.

As shown in FIG. 5A, in the producing method, when the decompressing step is carried out, the pouring unit 110 is moved down. Then, the three-way valve 112 is brought into contact with the step portion of the pouring hole 33 to seal the pouring hole 33, and the exterior 30 is connected to the port on the lower side of the three-way valve 112.

Further, in the producing method, the three-way valve 112 is controlled to bring the exterior 30 and the vacuum pump into communication with each other, and the vacuum pump is driven to reduce the internal pressure of the exterior 30.

As shown in FIG. 5B, in the producing method, after the pressure of the exterior 30 is reduced, the three-way valve 112 is controlled to bring the exterior 30 and the pouring pod 111 into communication with each other, and the electrolyte solution E is poured into the exterior 30 by using a pressure difference between the internal pressure of the exterior 30 and the internal pressure of the vacuum pod.

At this time, as shown in FIGS. 6A and 6B, the electrolyte solution E swiftly permeates into both the axial end portions 100a and 100b of the wound body 100 by a capillary phenomenon immediately after pouring the electrolyte solution E (See the arrow shown in FIGS. 6A and 6B).

Thereby, both the axial end portions 100a and 100b of the wound body 100 are impregnated with the electrolyte solution E, and the space formed between the laminated surfaces of the positive electrode 101, the negative electrode 102 and the separator 103 is filled with the electrolyte solution E.

In other words, the internal space S1 becomes a sealed space by being isolated from the external space S by the electrolyte solution E immediately after pouring the electrolyte solution E.

At the time point at which the internal space S1 becomes the sealed space, the external space S and the internal space S1 are spaces having a pressure sufficiently lower than the atmospheric pressure, namely, vacuum layers.

In the producing method of the present embodiment, an additive is added into a solution obtained by dissolving a lithium salt into an organic solvent or the like, and the obtained resultant is used as the electrolyte solution E.

The lithium salt may be, for example, LiPF6 (lithium hexafluorophosphate) or the like.

The organic solvent may be, for example, ethylene carbonate or the like.

In the producing method of the present embodiment, a substance represented by the following structural formula is added as the additive.

[Chem. 1]

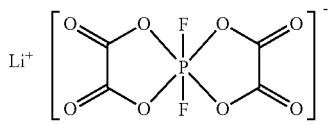

In the following description, the substance represented by the aforesaid structural formula 1 is denoted as "additive LPFO".

In this manner, in the producing method of the present embodiment, the electrolyte solution E having the additive LPFO added thereto is poured into the exterior 30 in the pouring step.

As shown in FIG. 3, in the producing method, after the electrolyte solution E is poured into the exterior 30, the inside of the exterior 30 is returned to atmospheric pressure (1 atm in the present embodiment)(See the arrow A in the downward direction shown in FIG. 3).

At this time, in the producing method, the pouring unit 110 is upward moved from the state shown in FIG. 6A so as to open the exterior 30 to atmospheric air. This allows that, in the producing method, the pressure of the external space S is returned to atmospheric pressure.

The difference between the pressure of the external space S returned to atmospheric pressure and the pressure of the internal space S1 is as small as approximately 1 atm at the maximum.

Therefore, at the time of opening to ambient air, the air introduced into the exterior 30 (external space S) cannot push the electrolyte solution E that has permeated into both the axial end portions 100a and 100b of the wound body 100 away.

For this reason, after the exterior 30 is opened to ambient air, the internal space S1 remains in a state of being isolated from the external space S, namely, a state of keeping a reduced pressure (state in which the vacuum layer is formed).

In the producing method, it is sufficient to set the pressure of the external space of the wound body to be higher than the pressure of the internal space of the wound body to such a degree that the internal space of the wound body can maintain the state of being isolated from the external space of the wound body after the pouring step, so that the external space of the wound body need not be necessarily returned to atmospheric pressure after the pouring step.

For example, in the producing method, the internal space of the wound body may be pressurized to a pressure higher by several Pa or lower by several Pa than the atmospheric pressure after the pouring step.

In the producing method, after the inside of the exterior 30 is returned to atmospheric pressure, a cap 40 is mounted on the pouring hole 33, and laser is radiated along the outer peripheries of the cap 40 with use of a laser welding machine, thereby to finally seal the pouring hole 33 (See the triangle in solid black shown in FIG. 3).

In this manner, in the producing method, a sealing step is carried out in which the cap 40 is welded onto the pouring hole 33 to finally seal the pouring hole 33 with the cap 40, thereby sealing the exterior 30 into which the electrolyte solution E has been poured.

This allows that the external space S becomes a sealed space. At this time, the pressure of the external space S is the atmospheric pressure.

As shown in FIG. 7, in the producing method, after performing the sealing step, an impregnating step is carried out in which the exterior 30 is left to stand for a predetermined period of time to impregnating the electrolyte solution E into the wound body 100 (See the exterior 30 shown in the upper left part of FIG. 7).

In the producing method, penetration of air from the outside into the exterior 30 during the impregnating step is prevented by performing the sealing step before the impregnating step (after impregnating the electrolyte solution E into both the axial end portions 100a and 100b of the wound body 100).

This allows that, in the producing method, decrease in the battery performance caused by evaporation of the electrolyte solution E or influence of moisture and oxygen contained in the air can be suppressed.

When the sealing step and the impregnating step are carried out, the pressure of the external space S is the atmospheric pressure. On the other hand, the pressure of the internal space S1 is of a high vacuum degree, namely, a pressure close to vacuum.

In other words, in the producing method, the sealing step and the impregnating step are carried out in a state where the pressure of the external space S is higher than that of the internal space SI.

Figure 8A:
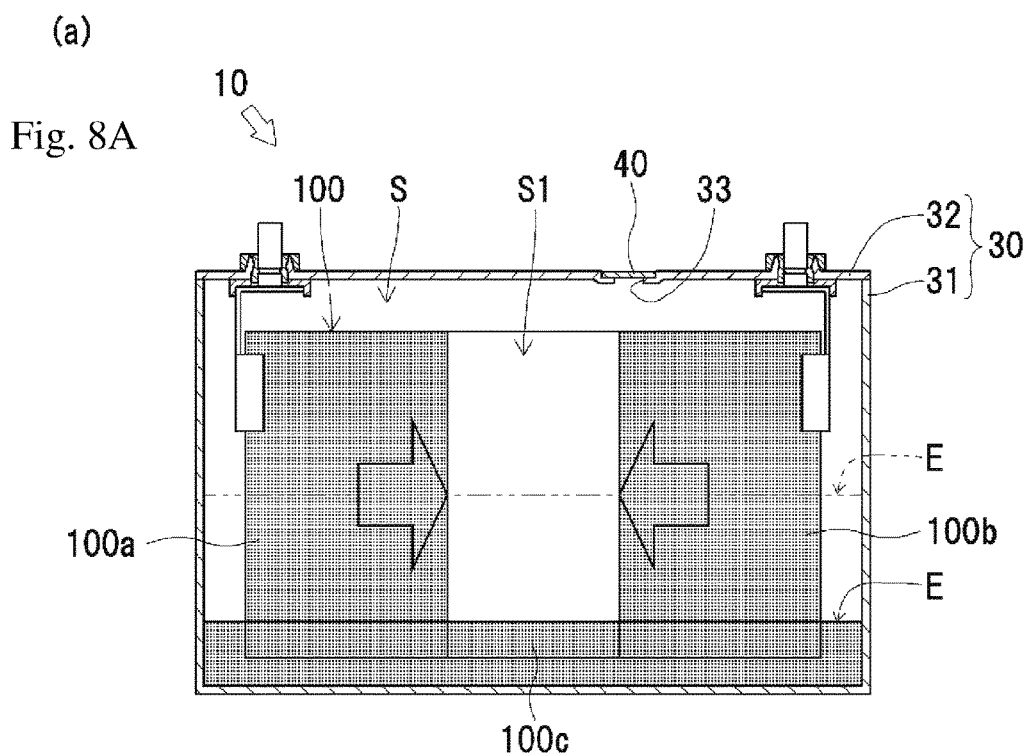
FIGS. 8A and 8B shows a degree of permeation of the electrolyte solution in the impregnating step.
Figure 8B:
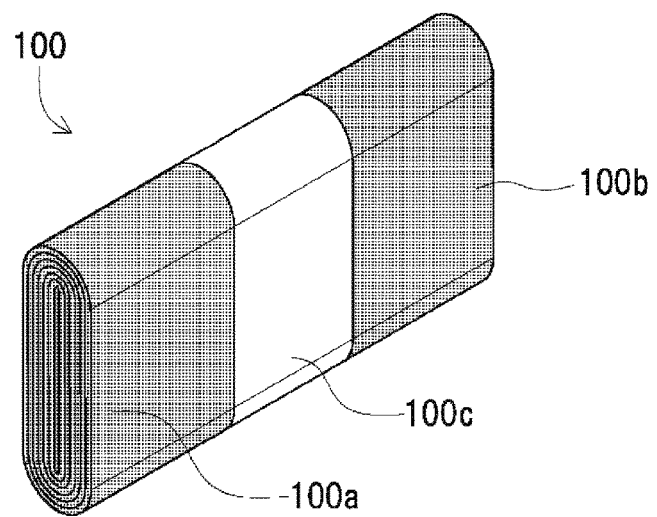

Thereby, as shown in FIGS. 8A and 8B, in the producing method, the electrolyte solution E is impregnated into the wound body 100 so as to eliminate the difference between the pressure of the external space S and the pressure of the internal space SI.

Specifically, the height position of the liquid level of the electrolyte solution E lowers in accordance with the permeation of the electrolyte solution E so that the volume of the external space S increases.

Therefore, the pressure of the external space S after the sealing step is carried out decreases in accordance with the permeation of the electrolyte solution E.

The electrolyte solution E permeates from both the axial end portions 100a and 100b towards the axial middle portion 100c and moves the internal space SI (vacuum layer) towards the axial middle portion 100c of the wound body 100 (See the arrow shown in FIG. 8A).

Therefore, the volume of the internal space SI decreases in accordance with the permeation of the electrolyte solution E. For this reason, the pressure of the internal space S1 increases in accordance with the permeation of the electrolyte solution E.

In other words, in the producing method, the pressure of the external space S that decreases in accordance with the permeation of the electrolyte solution E is set to be higher than the pressure of the internal space S1 that increases in accordance with the permeation of the electrolyte solution E, thereby to reduce the difference between the pressure of the external space S and the pressure of the internal space S1 by the permeation of the electrolyte solution E.

This allows that, in the producing method, the electrolyte solution E can effectively permeate into the wound body 100 by using the difference between the pressure of the external space S and the pressure of the internal space S1.

Therefore, the producing method can quicken permeation of the electrolyte solution E into the wound body 100.

In this manner, in the impregnating step, while maintaining the sealing state of the exterior 30, a process of waiting to reduce the difference between the pressure of the external space S and the pressure of the internal space S1 in the sealed exterior 30 is carried out, and thereby the electrolyte solution E is impregnated into the wound body 100 from both the axial end portions 100a and 100b of the wound body 100 to reduce the volume of the internal space S1. Also, the wound body 100 is left to stand after the sealing step, and thereby the electrolyte solution E is impregnated into the wound body 100 from both the axial end portions 100a and 100b to reduce the volume of the internal space S1.

The electrolyte solution E permeates into the wound body 100 at a higher speed according as the difference between the pressure of the external space S and the pressure of the internal space S1 is larger. For this reason, the electrolyte solution E swiftly permeates into the wound body 100 immediately after the sealing step.

In accordance with the permeation of the electrolyte solution E, the difference between the pressure of the external space S and the pressure of the internal space S1 decreases. For this reason, the speed of the electrolyte solution E permeating into the wound body 100 decreases in accordance with the lapse of time.

Then, the permeation of the electrolyte solution E into the wound body 100 stops when the pressure of the external space S and the pressure of the internal space S1 come to an equilibrium (become well-balanced).

Therefore, in the impregnating step of the present embodiment, a process of waiting is carried out until the pressure of the external space S and the pressure of the internal space S1 come to an equilibrium.

The period of time for waiting in such a impregnating step is suitably set, for example, on the basis of the result obtained by measuring the internal pressure of the exterior 30, namely, the pressure of the external space S, with use of a commercially available pressure sensor and evaluating the time until the result of measurement of the above pressure sensor becomes constant, or the like.

The wound body 100 is housed in the exterior 30 in a state in which a slight gap is formed between the two thickness-direction side surfaces of the wound body 100 and the two lateral-direction side surfaces of the housing 31 or in a state in which the two thickness-direction side surfaces of the wound body 100 and the two lateral-direction side surfaces of the housing 31 are in close contact.

Therefore, in a state before pouring the electrolyte solution E, the space on the upper and lower sides and on the left and right sides of the wound body 100 occupies most of the volume of the external space S.

Also, by pouring the electrolyte solution E into the exterior 30, the volume of the external space S decreases, for example, to approximately half.

In other words, because the volume of the external space S is small when the impregnating step is started, the pressure of the external space S tends to decrease in accordance with the permeation of the electrolyte solution E.

Therefore, the electrolyte solution E does not permeate to reach the axial middle portion 100c of the wound body 100 even when a process of waiting is carried out until the pressure of the external space S and the pressure of the internal space S1 come to an equilibrium.

Figure 9A:
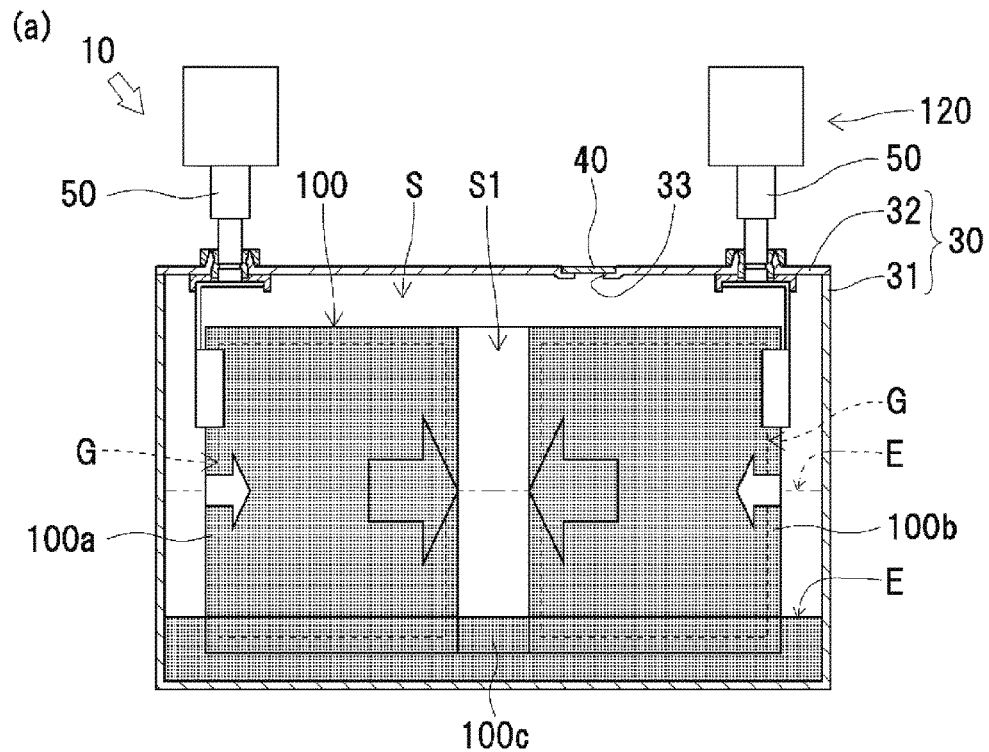
FIGS. 9A and 9B shows a degree of permeation of the electrolyte solution in an initial charging step.
Figure 9B:
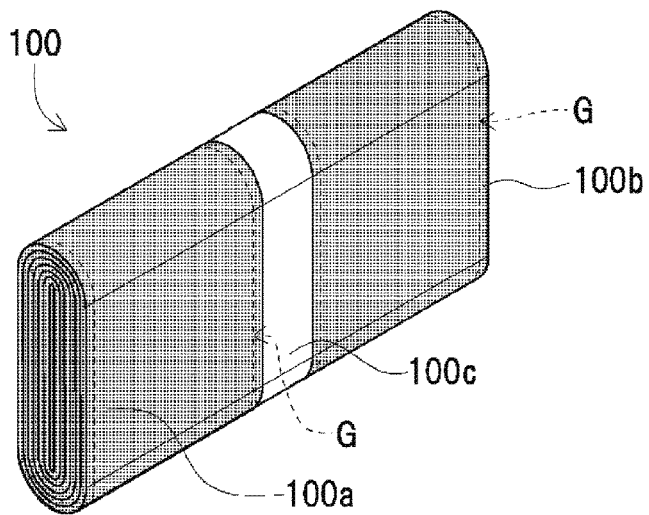

As shown in FIGS. 7, 9A and 9B, in the producing method, after the impregnating step is carried out, an initial charging step for initially charging the battery 10 in which the electrolyte solution E has been impregnated into the wound body 100 is carried out.

At this time, in the producing method, the exterior 30 is constricted with use of a constricting jig while maintaining the sealing state of the exterior 30, and a load weight of a predetermined size is applied to the exterior 30 along the thickness direction (rearward direction of the document sheet in FIG. 7) of the exterior 30.

Further, in the producing method, the electrodes of a power source device 120 are connected to the external terminals 50 so as to perform initial charging of the battery 10.

This allows that, in the wound body 100, the additive LPFO (electrolyte solution E) undergoes decomposition reaction at the part into which the electrolyte solution E has been impregnated, and a membrane is formed at the part into which the electrolyte solution E has been impregnated.

At this time, in the wound body 100, the membrane is formed starting from both the axial end portions 100a and 100b (See the arrow in solid white shown in FIG. 9A).

Also, at the part of the wound body 100 where the membrane has been formed, a gas G is generated by decomposition reaction of the additive LPFO (electrolyte solution E) excluding the decomposition reaction of forming the membrane.

In other words, in the initial charging step, the gas G is generated on the outside of the internal space S1.

In this manner, in the producing method, by adding the additive LPFO into the electrolyte solution E, the gas G is intentionally generated at the time of forming the membrane, thereby to generate the difference between the pressure of the internal space S1 and the pressure of the space on the outside thereof (in more detail, the part of the wound body 100 where the membrane has been formed).

For this reason, in the producing method, the electrolyte solution E can be impregnated into the wound body 100 even when the initial charging step is carried out (See the arrow shown in a neighborhood of the axial middle portion 100c of the wound body 100 of FIG. 9A).

Specifically, when the gas G is generated in the wound body 100 at the part into which where the electrolyte solution E located on the outside of the internal space S1 has been impregnated, the gas G becomes air bubbles that stay there. By the air bubbles staying at the part into which the electrolyte solution E has been impregnated, the electrolyte solution E is pushed out towards the axial middle portion 100c of the wound body 100 and towards the outside of the wound body 100.

Thereby, the electrolyte solution E is impregnated into the axial middle portion 100c of the wound body 100. Also, the electrolyte solution E that has been pushed out to the outside of the wound body 100 is pushed again into the wound body 100 by the pressure of the external space S that has become higher than the pressure of the internal space S1 by the air bubbles generated from the electrolyte solution E located on the outside of the wound body 100.

In this manner, in the initial charging step, the wound body 100 is impregnated with the electrolyte solution E by the generated gas G.

Therefore, the producing method allows the electrolyte solution E to permeate further towards the axial middle portion 100c of the wound body 100 and can compress the internal space SI (vacuum layer) to the axial middle portion 100c of the wound body 100 (See the arrow shown in the neighborhood of the axial middle portion 100c of FIG. 9A).

In other words, in the producing method, in the initial charging step, a membrane is formed at the part into which the electrolyte solution E has been impregnated in the impregnating step for the wound body 100, and also the electrolyte solution E is impregnated into the part into which the electrolyte solution E has not been impregnated in the impregnating step, by utilizing the gas G generated at the time of forming the membrane (See the arrow shown in FIG. 9A).

Figure 10A:
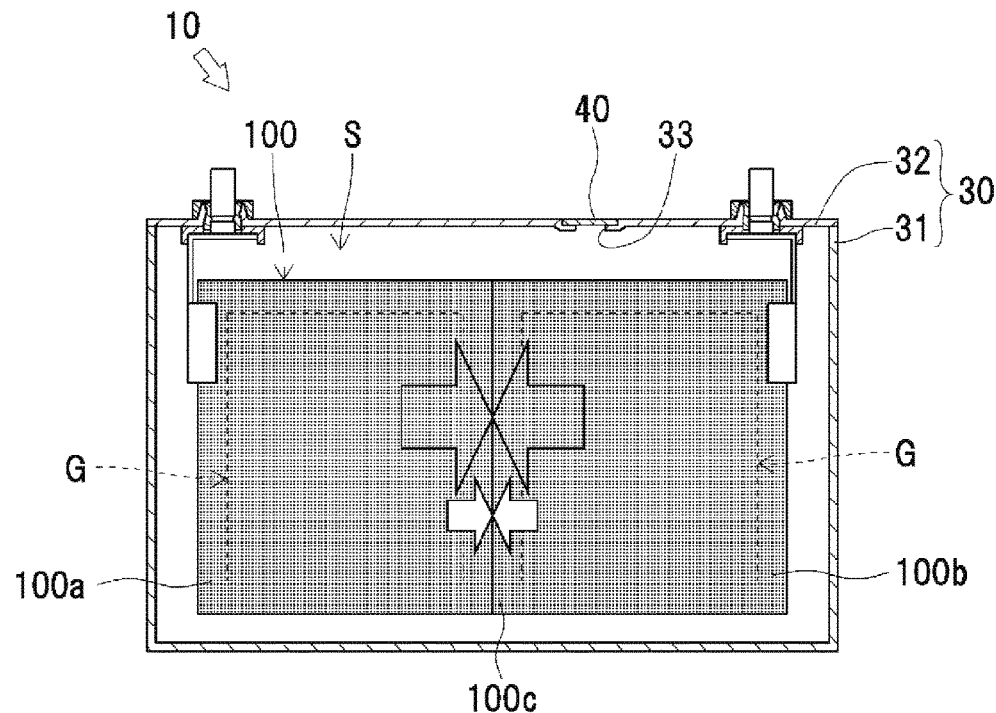
FIGS. 10A and 10B shows a degree of permeation of the electrolyte solution after the initial charging step.
Figure 10B:
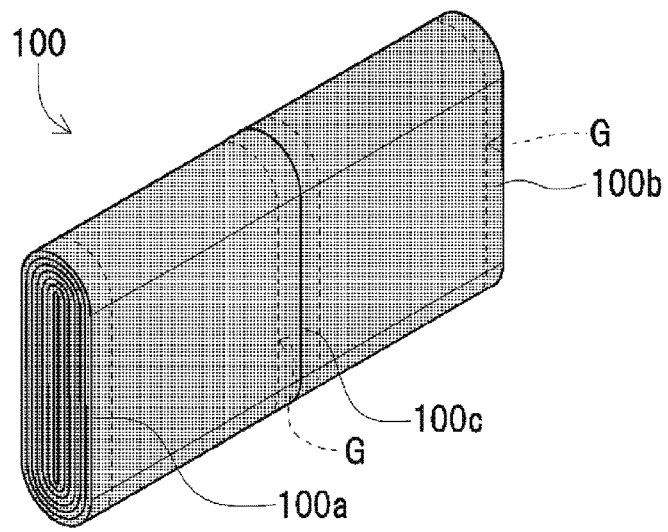

As shown in FIG. 10, therefore, the producing method allows the electrolyte solution E to permeate up to the axial middle portion 100c of the wound body 100 during the initial charging step. In other words, the producing method allows the electrolyte solution E to permeate into the whole surface of the wound body 100.

Also, in the producing method, after the membrane is formed at the part into which the electrolyte solution E has been impregnated in the impregnating step (at the part of the wound body 100 excluding the axial middle portion 100c), a membrane can be formed at the part into which the electrolyte solution E has been impregnated during the initial charging step (at the axial middle portion 100c).

This allows that the producing method can form a membrane sequentially in a direction from both the axial end portions 100a and 100b towards the axial middle portion 100c of the wound body 100. Also, by intentionally generating the gas G at the part where the membrane has been formed, the producing method can prevent the electrolyte solution E from being unnecessarily brought into contact with an active substance (after the membrane is formed).

Therefore, the producing method can prevent the membrane from being excessively formed at the part into which the electrolyte solution E has been impregnated in the impregnating step.

In other words, the producing method can form a uniform membrane over the whole surface of the wound body 100. For this reason, the producing method can produce a battery 10 capable of drawing out the potential to the maximum degree.

Also, by impregnating the electrolyte solution E into the axial middle portion 100c of the wound body 100 in the initial charging step, the producing method can compress the axial middle portion 100c, namely, the vacuum layer.

Therefore, the producing method can produce a battery 10 having a good heat dissipation property.

The electrolyte solution E permeates into the axial middle portion 100c of the wound body 100 to the same extent as the generation of the gas G, namely, in an amount of the same degree as the volume of the generated gas G.

For example, when approximately 3 cc of the gas G is generated in the initial charging step, the electrolyte solution E permeates into the axial middle portion 100c of the wound body 100 by an amount of approximately 3 cc.

Therefore, in the producing method, the additive LPFO is added into the electrolyte solution E in an amount adjusted so that the gas G is generated in the initial charging step in an amount of the same degree as the volume of the internal space S1 after the volume has decreased.

Also, the amount of addition of the additive LPFO to the electrolyte solution E can be set to be an amount such that the internal pressure of the exterior 30 immediately after the initial charging becomes of the same degree as the atmospheric pressure by the generation of the gas G during the initial charging.

This allows that the producing method can reduce the amount of the gas G generated in the initial charging step and can restrain the internal pressure of the exterior 30 from becoming unnecessarily high.

Therefore, the producing method can form a uniform membrane over the whole surface of the wound body 100 and can produce a battery 10 without performing a degassing treatment in subsequent steps.

In the producing method, it is preferable that most of the air in the internal space of the wound body is discharged to the outside in the decompressing step.

Therefore, the producing method allows a larger amount of the electrolyte solution to permeate into the wound body in the impregnating step and therefore can reduce the amount of the gas intentionally generated in the initial charging step. Therefore, the producing method can prevent the internal pressure of the exterior from becoming high in the initial charging step with certainty.

Also, in the impregnating step, there is not necessarily a need to wait until the pressure of the external space of the wound body and the pressure of the internal space of the wound body come to an equilibrium.

In the producing method of the present embodiment, by waiting until the pressure of the external space S and the pressure of the internal space S1 come to an equilibrium, the volume of the internal space S1 is made smaller before the pressurizing step. Therefore the producing method allows a larger amount of the electrolyte solution to permeate into the wound body in the impregnating step and therefore can reduce the amount of the gas intentionally generated in the initial charging step.

After performing the initial charging step, the producing method performs a high-temperature aging step for subjecting the exterior 30 (battery 10) to high-temperature aging. The high-temperature aging step is a step for leaving the exterior 30 to stand for a predetermined period of time under a high-temperature environment while maintaining the sealing state of the exterior 30 in a state where the exterior 30 is still constricted with the constricting jig that constricts the exterior 30 in the initial charging step.

Therefore, the producing method stabilizes the electric discharging property of the secondary battery 10.

In the producing method, after the high-temperature aging step is carried out, a test of voltage is carried out, and the constriction of the exterior 30 by the aforesaid constricting jig is released.

In the producing method, the battery 10 is produced in this manner.

As shown above, the additive LPFO is added into the electrolyte solution E of the battery 10 in an amount adjusted so that the gas G produced by decomposition reaction of the additive LPFO is generated at the time of the initial charging of the battery 10 in an amount of the same degree as the volume of the internal space S1 after the volume has decreased.

In the producing method, there is a possibility such that, depending on the shape of the wound body 100, for example, on the length and the thickness (winding number) in the axial direction thereof, there may not be enough time to form the membrane only in the initial charging step, so that the gas G cannot be generated in the initial charging step in an amount of the same degree as the volume of the internal space S1 after the impregnating step.

In this case, the membrane is formed successively in the high-temperature aging step. Therefore, in this case, in the producing method, the rest or the gas G is generated in the high-temperature aging step.

In other words, in this case, the electrolyte solution E permeates up to the axial middle portion 100c of the wound body 100 in the high-temperature aging step, and then the membrane is formed on the axial middle portion 100c of the wound body 100.

Specifically, permeation of the electrolyte solution E is carried out by pushing the electrolyte solution E into the axial middle portion 100c of the wound body 100 by the external space S that has come to have a high temperature to have an increased volume through the high-temperature aging step and the air bubbles of the gas G that are present in the external space S. In this case, by increase in temperature of the battery 10, the air bubbles dissolved in the electrolyte solution E escape to the outside, so that the permeation of the electrolyte solution E into the axial middle portion 100c of the wound body 100 is effectively carried out.

As mentioned above, in the high-temperature aging step, the exterior 30 is left to stand under a high-temperature environment. For this reason, the exterior 30 is heated to a predetermined temperature in the high-temperature aging step.

Therefore, in the high-temperature aging step, the pressure of the external space S and the internal space S1, namely, the internal pressure of the exterior 30, increases.

In the producing method of the present embodiment, the amount of the additive LPFO, namely, the amount of the gas G generated in the initial charging step, is adjusted so that the internal pressure of the exterior 30 becomes equal to or higher than the saturation vapor pressure of the electrolyte solution E in the high-temperature aging step. In this manner, the additive LPFO is added into the electrolyte solution E in an amount such that, by generation of the gas G, the internal pressure of the exterior 30 at the time of the high-temperature aging step becomes equal to or higher than the saturation vapor pressure of the electrolyte solution E at the time of the high-temperature aging.

This allows that the producing method can prevent volatilization of the electrolyte solution E during the high-temperature aging step.

Therefore, the producing method can prevent the electrolyte solution E volatilized during the high-temperature aging step from filling the axial middle portion 100c of the wound body 100. In other words, the producing method can prevent the volatilized electrolyte solution E from inhibiting the permeation of the liquid electrolyte solution E into the wound body 100.

For this reason, the producing method allows the electrolyte solution E to permeate into the axial middle portion 100c of the wound body 100 and can form the membrane on the axial middle portion 100c of the wound body 100 even in the high-temperature aging step.

Therefore, the producing method can form a uniform membrane on the wound body 100 with certainty irrespective of the shape of the wound body 100.

Also, in the producing method, the amount of the additive LPFO added into the electrolyte solution E, namely, the amount of the generated gas G, is adjusted so that the internal pressure of the exterior 30 becomes lower than the saturation vapor pressure of the electrolyte solution E before the high-temperature aging step (immediately after the initial charging step).

This allows that the producing method can prevent the internal pressure of the exterior 30 from becoming unnecessarily high, so that the battery 10 can be produced without performing a degassing treatment in the subsequent steps.

In this manner, the additive LPFO is added into the electrolyte solution E in an amount adjusted so that, by generation of the gas G, the internal pressure of the exterior 30 becomes equal to or higher than the saturation vapor pressure of the electrolyte solution E during the high-temperature aging step, and so that the internal pressure of the exterior 30 immediately after the initial charging step becomes lower than the saturation vapor pressure of the electrolyte solution E.

Such an amount of the additive LPFO is suitably set in accordance with the conditions of the high-temperature aging (temperature of heating the exterior 30), the internal pressure of the exterior 30 immediately after the initial charging step, and the like.

The gas G generated at the time of the initial charging step is generated in a certain electric potential region. The speed of forming the membrane increases according as the charging rate at the time of the initial charging step becomes higher.

Therefore, in the initial charging step of the producing method, the battery 10 is charged at a lower rate in an electric potential region where the gas G is generated than one in other electric potential regions, namely, by flowing a lower electric current through the battery 10.

In other words, in the producing method, the initial charging step is not carried out at a constant rate, but the initial charging step is carried out at a low rate in the electric potential region where the gas G is generated and at a high rate which is higher than the aforesaid low rate in the other electric potential regions.

Such an electric potential region where the gas G is generated differs depending, for example, on the kind of the additive and the like, and is confirmed in advance on the basis of the results obtained by measuring the pressure of the external space S with a commercially available pressure sensor in the initial charging step and evaluating the electric potential region where the pressure increases in the measurement results, or the like.

By performing the initial charging step in this manner, the producing method can make the speed of forming the membrane be moderate and can prevent formation of the membrane from catching up the permeation of the electrolyte solution E into the axial middle portion 100c of the wound body 100 with certainty. Also, the producing method allows the electrolyte solution E to permeate sufficiently into the axial middle portion 100c of the wound body 100.

Therefore, the producing method can form the membrane over the whole surface of the wound body 100 after permeation of the electrolyte solution E into the whole surface of the wound body 100 in the initial charging step (or in the high-temperature aging step).

In other words, the producing method can form a uniform membrane on the wound body 100 with more certainty as compared with the case of charging at a high rate.

In the producing method, it is preferable that the charging is carried out at a rate no greater than 1 C in the electric potential region where the gas is generated. In particular, in the producing method, it is particularly preferable that the charging is carried out at a rate no greater than 0.1 C.

This allows that the producing method can make the generation of the gas be more moderate and therefore can form a uniform membrane on the wound body with more certainty.

Next, a result of producing the batteries by changing the kinds of the additives added into the electrolyte solution E and evaluating the membrane of each battery is described.

As shown in FIG. 11, in the evaluation of the membrane, a battery 10 of the present embodiment produced by adopting the additive LPFO of the present embodiment and a battery produced by adopting LiBOB (lithium bisoxalatoborate, see the structural formula 2 shown below) as an additive were produced.

[Chem. 2]

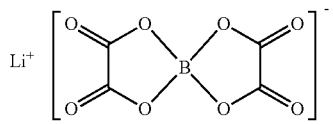

The additive LiBOB is an additive such that the amount of the gas generated by decomposition reaction at the time of forming the membrane is smaller than one in the case of the additive LPFO.

Hereinafter, the battery produced by adopting the additive LiBOB is referred to as a "battery of the Comparative Example".

In the evaluation of the membrane, each battery was produced under the same conditions except that the kinds of the additives were different.

In the evaluation of the membrane, after each battery was produced, the exterior 30 was disassembled to take out the wound body 100, and the elements of the membrane formed on the wound body 100 were analyzed, so as to evaluate the membrane.

In the case of the battery of the Comparative Example, elements of the membrane were detected a lot from the axial halfway portion of the wound body. Also, in the case of the battery of the Comparative Example, elements of the membrane were detected little from the axial middle portion of the wound body.

In other words, in the case of the battery of the Comparative Example, a uniform membrane was not formed on the wound body.

This seems to be due to the fact that, because the amount of the gas generated by de-composition reaction of the additive LiBOB at the time of the initial charging step is little, the electrolyte solution was not impregnated up to the axial middle portion of the wound body.

On the other hand, in the battery 10 of the present embodiment, a uniform membrane was formed from one axial end portion to the other axial end portion of the wound body 100 as compared with the battery of the Comparative Example.

Also, change of the internal pressure of the exterior 30 with lapse of time from the time after pouring the electrolyte solution E into the exterior 30 until the time of the end of the high-temperature aging was confirmed on the battery 10 using LPFO as an additive to the electrolyte solution E and the battery using LiBOB as an additive to the electrolyte solution E, and this is described.

As shown in FIG. 12, when the exterior 30 was sealed and left to stand after the electrolyte solution was poured into the exterior 30, the internal pressure of the exterior 30 decreased in accordance with the permeation of the electrolyte solution in both of the battery 10 with the additive LPFO and the battery with the additive LiBOB.

After that, when initial charging was carried out, the internal pressure of the exterior 30 returned to atmospheric pressure in the battery 10 with the additive LPFO in which the gas G was generated in a large amount, whereas little change was seen in the internal pressure of the exterior 30 in the battery with the additive LiBOB in which the gas G was generated in a small amount.

Further, when high-temperature aging was started, the internal pressure of the exterior 30 rose by increase in temperature of the battery. In this case, in the battery with the additive LiBOB, the electrolyte solution E kept being volatilized during the high-temperature aging because the internal pressure of the exterior 30 was a pressure lower than the saturation vapor pressure of the electrolyte solution E. Thus, the internal pressure of the exterior 30 kept increasing during the high-temperature aging.

On the other hand, in the battery 10 with the additive LPFO, the internal pressure of the exterior 30 rose to or above the saturation vapor pressure of the electrolyte solution E by increase in temperature of the battery 10. Therefore, volatilization of the electrolyte solution E was not generated during the high-temperature aging. In this manner, in the battery 10 with the additive LPFO, the internal pressure of the exterior 30 rose without being accompanied by volatilization of the electrolyte solution E, so that the permeation of the electrolyte solution E was quickened, and the wound body 100 was wetted uniformly over the whole surface.

Also, when the high-temperature aging was ended, the internal pressure of the exterior 30 decreased and returned to atmospheric pressure in the battery 10 with the additive LPFO. In the battery with the additive LiBOB also, the internal pressure of the exterior 30 decreased in accordance with the end of the high-temperature aging.

From the above, it is understood that, in the producing method, it is preferable to add an additive that generates the gas G easily (additive LPFO in the present embodiment) into the electrolyte solution E.

In the producing method, it is sufficient that the additive is an additive that generates a lot of gas by decomposition reaction at the time of forming the membrane, so that the additive is not limited to the additive LPFO such as in the present embodiment. For example, vinylidene carbonate may also be used as an additive that generates a gas by decomposition reaction at the time of forming the membrane.

INDUSTRIAL APPLICABILITY

The present invention may be applied to a method for producing a secondary battery, including a step for pouring an electrolyte solution into a battery case whose internal pressure is reduced, and to a secondary battery.

REFERENCE SIGNS LIST

10: battery (secondary battery)
30: exterior (battery case)
100: wound body
100a, 100b: axial end portion
E: electrolyte solution
LPFO: additive
S: external space
S1: internal space

The invention claimed is:
1. A method for producing a secondary battery comprising a sealed battery case having a wound body disposed therein, the method comprising:
  reducing an internal pressure of the battery case such that an external space of the wound body and an internal space of the wound body have a reduced pressure below atmospheric pressure, the internal space being a space between the sealed battery case and the wound body;
  pouring an electrolyte solution, into which an additive is added, into the battery case whose internal pressure is reduced, the external space being only partially filled with the electrolyte solution after completion of the pouring;

returning the external space of the wound body to atmospheric pressure, while keeping the reduced pressure of the internal space of the wound body, by opening the battery case into which the electrolyte solution is poured to an external atmosphere;

sealing the battery case which is returned to atmospheric pressure;

after sealing the battery case, waiting to reduce a difference between a pressure of the external space of the wound body and a pressure of an internal space of the wound body, and for impregnating the electrolyte solution into the wound body from both axial end portions of the wound body to reduce a volume of the internal space of the wound body;

performing initial charging of the secondary battery in which the wound body is impregnated with the electrolyte solution; and performing high-temperature aging of the initially charged secondary battery while maintaining the seal of the battery case, wherein the additive is added into the electrolyte solution in an amount such that, by a gas produced through decomposition reaction of the additive, the internal pressure of the battery cases when performing the high-temperature aging becomes equal to or higher than a saturation vapor pressure of the electrolyte solution in the high-temperature aging.

2. The method for producing a secondary battery according to claim 1,
wherein the additive is added into the electrolyte solution in an amount adjusted so that, by generation of the gas, the internal pressure of the battery case in when performing the high-temperature aging becomes equal to or higher than the saturation vapor pressure of the electrolyte solution in the high-temperature aging, and such that, when performing the initial charging, the internal pressure of the battery case becomes lower than the saturation vapor pressure of the electrolyte solution in the high-temperature aging.

3. The method for producing a secondary battery according to claim 1, wherein
the additive is added into the electrolyte solution in an amount such that, by generation of the gas, the internal pressure of the battery case immediately after the initial charging becomes equal to an atmospheric pressure.

4. The method for producing a secondary battery according to claim 1, wherein
when performing the initial charging, the secondary battery is charged at a lower rate in an electric potential region where the gas is generated than rate in other electric potential regions.

5. The method for producing a secondary battery according to claim 1, wherein
waiting to reduce the difference between the pressure of the external space of the wound body and the pressure of the internal space of the wound body comprises waiting until the pressure of the external space and the internal space come to an equilibrium.

* * * * *